United States Patent [19]

Chiba et al.

[11] Patent Number: 4,582,878

[45] Date of Patent: Apr. 15, 1986

[54] HIGH-RIGIDITY ETHYLENE-PROPYLENE COPOLYMER AND PROCESS FOR PRODUCING SAME

[75] Inventors: Hiromasa Chiba; Katsumi Kumahara; Takakiyo Harada; Takahiro Oka; Akihiro Sato, all of Ichiharashi, Japan

[73] Assignee: Chisso Corporation, Osaka, Japan

[21] Appl. No.: 634,311

[22] Filed: Jul. 25, 1984

[30] Foreign Application Priority Data

Jul. 26, 1983 [JP] Japan .................. 58-136349

[51] Int. Cl.[4] .......................................... C08F 297/08
[52] U.S. Cl. ................................. 525/268; 525/323
[58] Field of Search ............... 325/240, 247, 268, 323

[56] References Cited

U.S. PATENT DOCUMENTS

| | | | |
|---|---|---|---|
| 4,245,062 | 1/1981 | Suzuki et al. | 525/240 |
| 4,254,237 | 3/1981 | Shiga et al. | 525/323 |
| 4,337,326 | 6/1982 | Shiga et al. | 525/323 |

FOREIGN PATENT DOCUMENTS

| | | | |
|---|---|---|---|
| 3246447 | 7/1983 | Fed. Rep. of Germany | 526/351 |
| 44-20621 | 9/1969 | Japan | 525/323 |
| 52-8094 | 1/1977 | Japan | 525/323 |

*Primary Examiner*—Edward J. Smith
*Attorney, Agent, or Firm*—Fred Philpitt

[57] ABSTRACT

A high-rigidity, whitening-resistant ethylene-propylene copolymer is provided, which is obtained by copolymerizing propylene with ethylene at three successive stages wherein at the respective first, second and third stages, a copolymer fraction having a specified ethylene content is formed in a specified amount based on the total polymerization amount, in the presence of a catalyst obtained by reacting an organoaluminum compound (L) or a reaction product thereof with an electron donor (E) with $TiCl_4$; reacting the resulting solid product (I) with an (E) and an electron acceptor; and combining the resulting solid product (II) with an (L) and an aromatic carboxylic acid ester (R), the molar ratio of (R) to (II) being specified, and in the presence of hydrogen.

14 Claims, No Drawings

HIGH-RIGIDITY ETHYLENE-PROPYLENE COPOLYMER AND PROCESS FOR PRODUCING SAME

BACKGROUND OF THE INVENTION

1. Field of the Invention

The present invention relates to a high-rigidity ethylene-propylene copolymer and a process for producing the same. More particularly it relates to an ethylenepropylene-copolymer obtained by employing a specified Ziegler-Natta system catalyst and a three-stage block copolymerization process, and having a high-rigidity, almost no whitening due to impact or folding and a superior high impact strength and heat resistance, and a process for producing the same.

2. Description of the Prior Art

Crystalline polypropylene (hereinafter abbreviated to polypropylene) obtained by polymerizing propylene has superior physical properties such as rigidity, heat resistance, etc., but on the other hand, a problem that it has a low impact strength, particularly that at low temperatures has been raised; thus the range of its practical uses has been limited. In order to overcome this drawback, a number of processes for block-copolymerizing propylene with ethylene or another α-olefin have been proposed. According to these copolymerization processes, it is possible to obtain a propylene-α-olefin copolymer having a superior low-temperature, high-impact strength without so much damaging the superior characteristics of polypropylene such as high-rigidity, heat resistance, etc. On the other hand, a drawback as described below occurred to such a copolymer. Namely, when molded products are produced from such a copolymer, or the molded products are transported or used, an impact or a folding force loaded on the molded products causes the loaded part of the products to readily whiten. The molded products which whitened like this, naturally lose their commodity value at all. A number of processes for overcoming such a drawback of propylene-α-olefin block copolymers (hereinafter abbreviated to block copolymers) have been proposed. For example, ① Japanese patent application laid-open Nos. Sho 55-58245/1980, Sho 55-104333/1980, Sho 56-72042/1981 and Sho 57-137341/1982 are directed to a process of blending polyethylene with block copolymers. Such a process has a whitening-improving effectiveness, which, however, is still insufficient, and commercially a problem of uniform blending has been raised and also the blending cost cannot be neglected. Next, ② Japanese patent publication Nos. Sho 47-26190/1972 and Sho 49-24593/1974 and Japanese patent application laid-open No. Sho 58-15548/1983 are directed to a multi-stage polymerization wherein propylene homopolymer is prepared at the first stage and successively ethylene is copolymerized with propylene at multi-stages. However, as to the block copolymers obtained in these cases, while rigidity reduction can be prevented, the whitening-improving effectiveness is insufficient. Next, ③ Japanese patent application laid-open No. Sho 54-40895/1979 is directed to a process wherein hydrogen concentration is raised at the stage where an ethylene-propylene copolymer part is prepared, in the block copolymer production, to reduce the molecular weight corresponding to the part. In this case, however, the resulting block copolymer is insufficient in improving the low-temperature, high-impact strength. Next, ④ Japanese patent application laid-open Nos. Sho 54-13963/1979, Sho 55-16048/1980, Sho 56-55416/1981, Sho 57-34112/1982 and Sho 57-67611/1982 are directed to an ethylenepropylene multi-stage polymerization process wherein a small amount of ethylene is fed in the production process of a propylene polymer part at the first stage and polymerization for an ethylene-propylene copolymer part is carried out successively at multi-stages i.e. at the second stage et seq. However, the resulting block copolymer is notably reduced in the rigidity and heat resistance which are specific features intrinsic of polypropylene; hence such a process cannot also be regarded as a desirable process.

On the other hand, a number of processes for improving the rigidity of block copolymer mainly by improving the catalyst used for the processes, have been proposed. Namely ⑤ Japanese patent publication Nos. Sho 47-8207/1972, Sho 49-13231/1974 and Sho 49-13514/1974 are directed to an improved process wherein a third component is added to a catalyst. Further, ⑥ Japanese patent application laid-open No. Sho 55-764/1980, Sho 54-152095/1979 and Sho 53-29390/1978 and Japanese patent publication No. Sho 55-8011/1980 are directed to an improved process of using a specified catalyst. However, the above proposed processes ⑤ and ⑥ are directed to a technique for making the reduced extent of the rigidity of the resulting block copolymers as small as possible, as compared with polypropylene (homopolymer), that is, so to speak, a technique for relieving their drawbacks, and the processes have not yet attained rigidity values same as or higher than those of the homopolymer.

The object of the present invention is to provide an ethylene-propylene copolymer having a high-rigidity and whitening resistance by which the problems of the prior art as raised in the above processes ① ~ ⑥ have been solved according to the process described below. In order to attain the object, (i) we have specified the kind of stereoregular catalysts used, and (ii) have limited the polymerization conditions at the time of polymerizing propylene and ethylene at three stages.

As a result, all the above problems have been solved, and we have found a high-rigidity ethylene-propylene copolymer which has a superior heat resistance, rigidity and low-temperature, high-impact strength, causes no whitening phenomenon when stresses such as impact, folding, etc. are applied and results in a superior appearance when molded.

SUMMARY OF THE INVENTION

The present invention has the following two aspects (1) and (2):

(1) A high-rigidity, whitening-resistant ethylene-propylene copolymer, obtained by copolymerizing propylene with ethylene at the following three stages ①, ② and ③:

① a first stage wherein a copolymer fraction having an ethylene content of 0.5 to 5.0% by weight is formed in an amount of 60 to 90% by weight based on the total polymerization amount; successively ② a second stage wherein a copolymer fraction having an ethylene content of 85 to 100% by weight is formed in an amount of 5 to 17% by weight based on the total polymerization amount; and successively ③ a third stage wherein a copolymer fraction having an ethylene content of 65 to 80% by weight is formed in an amount of 6 to 23% by weight based on the total polymerization amount, in the presence of a catalyst obtained by reacting an organoaluminum compound (L) or a reaction product (P) of an organoaluminum compound (L) with an electron donor (A), with TiCl$_4$ (C), reacting the resulting solid product (I) with an electron donor (A) and an electron acceptor (B), and combining the resulting solid product (II) with an organoaluminum compound (L$_2$) and an aromatic carboxylic acid ester (R), the molar ratio of the carboxylic acid ester (R) to the solid product (II), R/II, being in the range of 0.2 to 10.0, and in the presence of hydrogen.

(2) A process for producing an ethylene-propylene copolymer which comprises copolymerizing propylene with ethylene at the following three stages ①, ② and ③:

① a first stage where a mixed monomer of ethylene with propylene having an ethylene content of 0.7 to 7.5% by weight is fed to form a copolymer fraction in an amount of 60 to 90% by weight based on the total polymerization amount; successively ② a second stage wherein ethylene or a mixed monomer of ethylene with propylene having an ethylene content of 70 to 100% by weight is fed to form a polymer or copolymer fraction in an amount of 5 to 17% by weight based on the total polymerization amount; and successively ③ a third stage wherein a mixed monomer of ethylene with propylene having an ethylene content of 40 to 70% by weight is fed to form a copolymer fraction in an amount of 6 to 23% by weight based on the total polymerization amount, in the presence of a catalyst obtained by reacting an organoaluminum compound (L) or a reaction product of an organoaluminum compound (L) with an electron donor (A), with TiCl$_4$ (C), reacting the resulting solid product (I) with an electron donor (A) and an electron acceptor (B), and combining the resulting solid product (II) with an organoaluminum compound (L$_2$) and an aromatic carboxylic acid ester (R), the molar ratio of the carboxylic acid ester (R) to the solid product (II), R/II, being in the range of 0.2 to 10.0, and in the presence of hydrogen.

DESCRIPTION OF THE PREFERRED EMBODIMENTS

Even if the above-mentioned solid product (II) as a catalyst component of the above-mentioned catalyst used in the present invention is replaced by various kinds of titanium trichloride i.e. the so-called A type, H type or AA type or HA type titanium trichloride, obtained by reducing TiCl$_4$ with metal aluminum or hydrogen or activating the resulting reduction material by milling, it is impossible to attain the object of the present invention. Further, with a material obtained by supporting TiCl$_4$ on a carrier such as magnesium chloride or a material obtained by reducing TiCl$_4$ with an organoaluminum compound, followed by mere heat-treatment, it is also impossible to attain the object of the present invention.

The solid product (II) used in the present invention is prepared as follows:

First, (i) an organoaluminum compound (L) is reacted with TiCl$_4$ (C), or (ii) a reaction product of the former with an electron donor (A) is reacted with the latter, to prepare a solid product (I). The process (ii) can yield a finally preferable titanium catalyst component. The process (ii) is described in Japanese patent application laid-open No. Sho 56-110707/1981 as follows:

The reaction of an organoaluminum compound (L) with an electron donor (A) is carried out in a solvent (D) at a temperature of $-20°$ C. to $200°$ C., preferably $-10°$ C. to $100°$ C. for a period of 30 seconds to 5 hours. The addition order of (L), (A) and (D) has no limitation, and as for the ratio of the amounts used, 0.1 to 8 mols, preferably 1 to 4 mols of an electron donor per mol of an organoaluminum compound, and 0.5 to 5 l, preferably 0.5 to 2 l of a solvent are suitable. Aliphatic hydrocarbons are preferable as the solvent. Thus, a reaction product (P) is obtained. The reaction product (P) may be subjected in a liquid state after completion of the reaction (hereinafter referred to often as reaction liquid (P)), to the subsequent reaction.

The reaction of the reaction product (P) with TiCl$_4$ (C) is carried out at a temperature of $0°$ to $200°$ C., preferably $10°$ to $90°$ C. and for a period of 5 minutes to 8 hours. Non-use of solvent is preferable, but aliphatic or aromatic hydrocarbons may be used. The mixing of (P), (C) and the solvent may be carried out in any order, and mixing of the total amounts is preferably completed within 5 hours. Thereafter reaction is preferred to be continuously carried out at $10°$ to $90°$ C. within 8 hours. As for the respective amounts used in the reaction, 0 to 3,000 ml of a solvent per mol of TiCl$_4$ is used and the reaction product (P) is used in a ratio of the number of Al atoms in (P) to the number of Ti atoms in TiCl$_4$ (Al/Ti) of 0.05 to 10, preferably 0.06 to 0.2, per mol of TiCl$_4$. After completion of the reaction, the resulting liquid portion is separated and removed by filtering off or decantation, followed by repeated washings with a solvent. The resulting solid product (I) may be used in the state where it is suspended in the solvent, in the subsequent reaction, or may be further dried, taken out in the form of solid matter and used.

Next, the solid product (I) is reacted with an electron donor (A) and an electron acceptor (B). This reaction may be carried out without using any solvent, but use of aliphatic hydrocarbons yields a better result. The respective amounts used are 10 to 1,000 g, preferably 50 to 200 g of (A), 10 to 1,000 g, preferably 20 to 500 g of (B) and 0 to 3,000 ml, preferably 100 to 1,000 ml of a solvent, each based on 100 g of the solid product (I). These 3 or 4 substances are preferred to be mixed at $-10°$ to $40°$ C. for 30 seconds to 60 minutes and reacted at $40°$ to $200°$ C., preferably $50°$ to $100°$ C., for 30 seconds to 5 hours. The mixing order of the solid product (I), (A), (B) and solvent has no limitation. (A) and (B) may be reacted together in advance of mixing them with the solid product (I), and in this case, there is used a reaction product obtained by reacting (A) with (B) at $10°$ to $100°$ C. for 30 minutes to 2 hours, followed by cooling the resulting product down to $40°$ C. or lower. After completion of the reaction of the solid product (I) with (A) and (B), a liquid portion is separated and removed from the reaction mixture by filtering off or decantation, followed by repeated washings with a solvent to remove unreacted liquid raw materials whereby a solid product (II) is obtained. The solid product (II) is dried and taken out in the form of a solid matter, or subjected to the subsequent use in the state where it is suspended in the solvent, as it is. The thus obtained solid product (II) is combined with 0.1 to 500 g of an organoaluminum compound per g of the solid product and a definite amount of an aromatic ester described later to obtain a catalyst, or more preferably, this catalyst is preactivated by reacting an α-olefin therewith, followed by adding the ester, to obtain the catalyst of the present invention.

The organoaluminum compounds (L) and (L$_2$) used in the present invention are expressed by the general formula AlR$_n$R'$_{n'}$X$_{3-(n+n')}$ wherein R and R' each represent a hydrocarbon group such as alkyl group, aryl group, alkaryl group, cycloalkyl group, etc. or alkoxy group; X represents a halogen such as fluorine, chlorine, bromine or iodine; and n and n' each represent an optional number of $0 < n+n' \leq 3$, and concrete examples are trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc.; alkylaluminum hydrides such as diethylaluminum hydride, dibutylaluminum hydride; and alkylaluminum sesqui or dihalides such as methylaluminum sesquichloride, ethylaluminum sesquichloride, ethylaluminum dichloride, i-butylaluminum dichloride, etc. Besides, alkoxyalkylaluminums such as monoethoxydiethylaluminum, diethoxymonoethylaluminum, etc. may be also used. These organoaluminum compounds may be employed in admixture of two or more kinds. The organoaluminum compound (L) for obtaining the solid product (P) may be the same as or different from the organoaluminum compound (L$_2$) to be combined with the solid product (II).

As for the electron donors (A) employed in the present invention, various kinds are illustrated below, but preferably ethers are mainly used and other electron donors are employed together with ethers. As for the electron donors employed, organic compounds containing at least one atom of oxygen, nitrogen, sulfur and phosphorus, such as ethers, alcohols, esters, aldehydes, fatty acids, ketones, nitriles, amines, amides, ureas, thioureas, isocyanates, azo compounds, phosphines, phosphites, phosphinites, thioethers, thioalcohols, etc. Concrete examples are ethers such as diethyl ether, di-n-propyl ether, di-n-butyl ether, di(isoamyl) ether, di-n-pentyl ether, di-n-hexyl ether, di-i-hexyl ether, di-i-octyl ether, di-n-octyl ether, di-n-dodecyl ether, diphenyl ether, ethylene glycol monomethyl ether, diethylene glycol dimethyl ether, tetrahydrofuran, and the like; alcohols such as methanol, ethanol, propanol, butanol, pentanol, hexanol, octanol, etc., phenols such as phenol, cresol, xylenol, ethylphenol, naphthol and the like; esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate and the like; aldehydes such as acetaldehyde, benzaldehyde and the like; fatty acids such as formic acid, acetic acid, propionic acid, butyric acid, oxalic acid, succinic acid, acrylic acid, maleic acid and the like; aromatic acids such as benzoic acid and the like; ketones such as methyl ethyl ketone, methyl isobutyl ketone, benzophenone and the like; nitriles such as acetonitrile, butyronitrile, etc.; amines such as methylamine, diethylamine, tributylamine, triethanolamine, β(N,N-dimethylamino)ethanol, pyridine, quinoline, α-picoline, N,N,N',N'-tetramethylhexaethylene diamine, aniline, dimethylaniline and the like; amides such as formamide, hexamethylphosphoric acid triamide, N,N,N',N',N"-pentamethyl-N-β-dimethylaminomethylphosphoric acid triamide, octamethylpyrophosphoroamide and the like; ureas such as N,N,N',N'-tetramethylurea and the like; isocyanates such as phenylisocyanate, toluylisocyanate and the like; azo-compounds such as azobenzene, azotoluene, and the like; phosphines such as ethylphosphine, triethylphosphine, tri-n-butylphosphine, tri-n-octylphosphine, triphenylphosphine, triphenylphosphine oxide and the like; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite and the like; thioethers such as diehtyl thioether, diphenyl thioether, methyl phenyl thioether, ethylene sulfide, propylene sulfide and the like; and tioalcohols such as ethylthioalcohol, n-propylthioalcohol, thiophenol and the like. These electron donors (A) may be used in admixture of two or more kinds in an optional proportion.

The electron acceptors (B) employed in the present invention are represented by halides of elements of Groups III to VI of the Periodic Table. Concrete examples are anhydrous aluminum chloride, SiCl$_4$, SnCl$_2$, SnCl$_4$, TiCl$_4$, VCl$_4$, SbCl$_5$, etc. These may be used in admixture. TiCl$_4$ is most preferable.

As the solvent (D) the following are used:

As aliphatic hydrocarbons, n-heptane, n-octane, i-octane, etc. are exemplified. Further, in place of or together with aliphatic hydrocarbons, halogenated hydrocarbons may also be used such as carbon tetrachloride, chloroform, dichloroethane, trichloroethylene, tetrachloroethylene, etc. As aromatic compounds, aromatic hydrocarbons such as benzene, naphthalene and their derivatives such as alkyl substitutes e.g. mesitylene, durene, ethylbenzene, isopropylbenzene, 2-ethylnaphthalene, 1-phenylnaphthalene, halogenated compounds e.g. monochlorobenzene, o-dichlorobenzene, etc. are exemplified.

The thus obtained solid product (II) is combined with an organoaluminum compound (L$_2$) and the above aromatic carboxylic acid ester to obtain a catalyst which is then used for ethylene-propylene copolymerization according to the process of the present invention, or preferably an α-olefin is reacted with the above catalyst to obtain a preactivated catalyst which is then used for the polymerization. As the organoaluminum compounds (L$_2$), dialkylaluminum monohalides expressed by the formula (AlR$_1$R$_2$X) are preferred. In the formula, R$_1$ and R$_2$ each represent a hydrocarbon group such as alkyl group, aryl group, alkaryl group, cycloalkyl group, etc. or an alkoxy group and X represents a halogen atom of F, Cl, Br or I. Concrete examples are diethylaluminum monochloride, di-n-butylaluminum monochloride, diisobutylaluminum monochloride, diethylaluminum monochloride, etc.

For the slurry or bulk polymerization, even a catalyst obtained by combining the solid product (II) with an organoaluminum compound (L$_2$) exhibits a sufficient effectiveness, but for the gas phase polymerization, a catalyst having a higher activity, obtained by further reacting an α-olefin for preactivation is preferred. In the case of slurry or bulk polymerization followed by gas phase polymerization, even if the catalyst initially used is the former unpreactivated catalyst, this catalyst has already been reacted with propylene and ethylene at the stage of the gas phase polymerization; hence the catalyst has been changed into the same catalyst as the latter, to exhibit a superior effectiveness.

For the preactivation, it is preferred that an α-olefin be reacted using 0.1 to 500 g of an organoaluminum compound, 0 to 50 l of a solvent, 0 to 1,000 ml of hydrogen and 0.05 to 5,000 g, preferably 0.05 to 3,000 g of an α-olefin, each based on 1 g of the solid product (II) at 0° to 100° C. for one to 20 hours to have 0.01 to 2,000 g, preferably 0.05 to 200 g of the α-olefin reacted based on 1 g of the solid product (II).

The reaction of an α-olefin for the preactivation may be carried out either in an aliphatic or aromatic hydrocarbon solvent or in a liquefied α-olefin such as liquefied propylene, liquefied butene-1, etc. without using any solvent, or ethylene, propylene, etc. may be reacted in gas phase. Further it is also possible to carry out the preactivation in the coexistence of an α-olefin polymer preferably ethylene propylene copolymer prepared in advance or hydrogen.

The method for the preactivation includes various embodiments such as (1) a method wherein a catalyst obtained by combining the solid product (II) with an organoaluminum compound is contacted with an α-olefin and the resulting catalyst is used for the slurry or bulk reaction; (2) a method wherein the solid product (II) is combined with an organoaluminum compound in the presence of an α-olefin; (3) a method wherein an α-olefin polymer is made coexistent in the methods (1) or (2); (4) a method wherein hydrogen is made coexistent in the methods (1), (2) or (3); etc. In the preactivation, it is also possible to add an aromatic ester (R) in advance.

Examples of α-olefins used for the preactivation are straight chain monoolefins such as ethylene, propylene, butene-1, hexene-1, heptene-1, etc., branched chain monoolefins such as 4-methyl-pentene-1, 2-methyl-pentene-1, 3-methyl-butene-1, etc., styrene, etc. These α-olefins may be the same as or different from ethylene or propylene to be polymerized, or may be used in admixture.

After the preactivation, ① the solvent, organoaluminum compound and unreacted α-olefin may be removed by distilling off under reduced pressure, filtering off, decantation, etc. to use the resulting material in the form of dry powder for polymerization; or ② the powder may be used in a state where it is suspended in a solvent within a range of 80 l or less based on 1 g of the solid product. Further it is also possible to add a fresh organoaluminum compound in the polymerization.

The thus obtained preactivated catalyst can be used for slurry polymerization wherein propylene and ethylene are copolymerized in a hydrocarbon solvent such as n-hexane, n-heptane, n-octane, benzene, toluene, etc. or bulk polymerization carried out in a liquefied propylene, or gas phase polymerization. However, in order to raise the rigidity of the objective ethylene-propylene copolymers, it is necessary to add an aromatic carboxylic acid ester (R) (hereinafter abbreviated to aromatic ester) to the catalyst (II) in a molar ratio of (R)/(II) of 0.1 to 10.0. If the amount of the aromatic ester added is less, improvement in the rigidity is insufficient, while if it is too large, the catalyst activity is reduced; hence such amounts are not practical. Concrete examples of the aromatic esters are ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, propyl naphthoate, butyl naphthoate, 2-ethylhexyl naphthoate, ethyl phenylacetate, etc. The molar ratio (Al/Ti) of the organoaluminum compound ($L_2$) to the solid product (II) is 0.1 to 100, preferably 1 to 20. In this case the number of mols of the solid product (II) refers to substantially the number of g atoms of Ti in (II).

The polymerization conditions for the ethylene-propylene copolymer at the first stage of the present invention are as follows:

The objective MFR usually falls in the range of 0.05 to 100. The hydrogen concentration in the gas phase is 0.5 to 20% by mol. The polymerization temperature usually is in the range of 20° to 80° C., preferably 40° to 70° C. Temperatures lower than 20° C. are not practical since the catalyst activity is reduced, while higher temperatures than 80° C. increase the formation proportion of the polymer soluble in the polymerization catalyst. The polymerization pressure is 0 to 50 $Kg/cm^2G$ and the temperature is usually about 30 minutes to 15 hours.

The propylene-ethylene block copolymerization of the present invention may be carried out in any form of slurry polymerization wherein an inert solvent such as propane, hexane, heptane, etc. is used, bulk polymerization carried out in liquefied propylene or gas phase polymerization carried out on gaseous propylene or a combination of two or more of the foregoing. However, in order to improve the aimed rigidity of the polymer, it is preferable to carry out the first stage polymerization according to slurry, bulk or gas phase polymerization process and carry out the second and third stage polymerizations according to slurry polymerization process.

In the first stage polymerization of the present invention, a mixed monomer of ethylene with propylene containing 0.7 to 7.5% by weight, preferably 1.5 to 4.0% by weight of ethylene is fed to a reactor to form a copolymer containing 0.5 to 5.0% by weight, preferably 1.0 to 3.0% by weight of ethylene in an amount of 60 to 90% by weight, preferably 70 to 86% by weight based on the amount of a copolymer to be ultimately obtained.

If the ethylene content in the polymer at the first stage is less than 0.5% by weight, improvement in whitening is insufficient. If it exceeds 5.0% by weight, rigidity and heat resistance are reduced. As for ethylene fed at the first stage, although it is possible to uniformly feed the ethylene during the polymerization period, the ethylene content in the copolymer obtained at the first stage is necessary to be 0.5 to 5.0% by weight, as described above.

The polymerization amount at the first stage is 60 to 90% by weight, preferably 70 to 86% by weight based on the total polymerization amount which is the sum of the above polymerization amount at the first stage and those at the second and third stages. If it is outside the former range, it is impossible to obtain a polymer satisfying all of the objective values of physical properties.

In the second stage polymerization according to the process of the present invention, usually a mixed monomer of ethylene with propylene containing 70 to 100% by weight, preferably 80 to 95% by weight of ethylene is fed and polymerized to form a copolymer fraction containing 85 to 100% by weight, preferably 90 to 98% by weight of ethylene in an amount of 5 to 17% by weight, preferably 7 to 14% by weight based on the total weight of the ultimate copolymer. If the ethylene content of the copolymer fraction is less than 85% by weight, the effectiveness of whitening improvement aimed in the present invention is insufficient.

Further, if the ethylene content of the copolymer fraction is higher than 100% by weight in calculation, that is, if the weight of the second stage copolymer fraction containing 100% by weight of ethylene exceeds 17% by weight of the total polymerization amount, then the molded product whitens and a copolymer having an inferior transparency is obtained.

If the polymerization amount at the second stage is outside the above range of 5 to 17% by weight, the effectiveness is almost the same as that in the case where the ethylene content is outside the above range. Namely if the amount is less than 5% by weight, the effectiveness of whitening improvement is insufficient, while if it exceeds 17% by weight, the rigidity of the resulting copolymer is reduced and also the molded product becomes white and opaque.

In the copolymerization of the present invention, the copolymer fractions formed at the first stage and the second stage are required to have the following ratio of MFRs:

$$MFR \text{ (at the first stage)}/MFR \text{ (at the second stage)} = 0.1 \sim 100.$$

If the ratio is less than 0.1, the impact strength and the tensile elongation of the ultimately obtained copolymer have a tendency of being reduced. At the same time, a disadvantage of reduction in the polymerization rate occurs, since the hydrogen concentration in the gas phase at the time of the first stage polymerization is very high. If the ratio exceeds 100, the effectiveness of whitening improvement in the molded products obtained from the resulting copolymer is somewhat reduced, and at the same time, surface-roughening occurs on the surface of the molded products. As for the gas phase hydrogen concentration at the second stage polymerization, for example if the polymerization temperature is 60° C., polymerization is carried out in 30 to 80% by mol. If the temperature is higher than 80° C., the hydrogen concentration for obtaining a preferable MFR can be somewhat reduced.

The third stage copolymerization of the present invention is also carried out in the presence of hydrogen. As for the proportion of ethylene and propylene fed, 40 to 70% by weight, preferably 45 to 55% by weight of ethylene based on the total amount of the two is fed, and the gases are preferably fed in the form of a mixed gas thereof. The copolymer fraction at this stage is formed so as to contain 65 to 80% by weight, preferably 70 to 75% by weight of ethylene (such a composition can be calculated from the compositions and yields of the respective copolymer fractions obtained at the second stage and the third stage, and this will be further described later), in an amount of 6 to 23% by weight, preferably 8 to 15% by weight based on the weight of the ultimately obtained copolymer. If the ethylene content in the copolymer fraction formed at the third stage is less than 65% by weight, the effectiveness of whitening improvement is insufficient as compared with the product of the present invention, while if it exceeds 80% by weight, the effectiveness of impact resistance improvement is insufficient. The effect of the proportion of the copolymerization amount at the third stage (the effect of the ratio by weight based on the total polymerization amount) is also similar to that in the above case of ethylene content. If the polymerization amount is less than 6%, improvement in the impact resistance is insufficient, while if it exceeds 23%, the resulting copolymer is inferior to the product of the present invention in the whitening-resistant tendency and rigidity.

The calculated value of MFR of the copolymer fraction formed at the third stage of the present invention (the value can be calculated from the respective MFRs and polymerization amounts of the second stage-completed material and the third stage-completed material) is preferred to be in the range of 0.05 to 0.5 g/10 min. If the calculated value is less than 0.05 or exceeds 0.5, molded products obtained from the resulting copolymer have a notable surface-roughening and whitening or a reduced impact resistance. Copolymerizations at the respective stages are carried out in a hydrogen concentration in the range of 5 to 25% by mol. As for the copolymerizations at the second stage and the third stage, even if their order is inverted, it is possible to obtain copolymers of the present invention having similar physical properties.

The ethylene-propylene copolymer of the present invention has overcome the correlative limitations between various physical properties of copolymers obtained according to block copolymerization process (e.g. if the strength of impact resistance is improved, the rigidity, heat resistance and whitening resistance lower), that is, as compared with control copolymers obtained according to known processes, the copolymer of the present invention has achieved a notable improvement in the rigidity and whitening, while maintaining the impact-resistant value on the same level.

Thus the products of the present invention can be broadly applied to various molding fields, and particularly in the sheet field and in the injection molding field, it is possible to extend the amount of the products used, due to improvement in the quality of molded products or reduction in the thickness thereof.

Further, when a nucleus-creating agent and/or an inorganic filler each in a suitable amount are blended with the copolymer of the present invention to obtain a composition of ethylene-propylene block copolymer, it is possible to produce molded products having well-balanced physical properties i.e. high rigidity, whitening resistance and impact resistance, which could have never been attained by known control polypropylene compositions.

The present invention will be further described by way of Examples, but it is not intended to be limited thereto. Methods for measuring values of various physical properties described in Examples are as follows:

◎MFR—ASTM D-1238 (g/10 min.), 230° C., 2.16 Kg load

◎Method for calculating MFRs at the respective polymerization stages—

$MFR_1$: MFR at the first stage (*1)

$MFR_2$: MFR at the second stage $MFR_3$: MFR at the third stage $MFR_{1+2}$: MFR of the whole formed through the first and second stages (*1)

$MFR_{1+2+3}$: MFR of the final product formed through the first, second and third stages (*1)

W₁: Proportion of the amount of a fraction polymerized at the first stage

W₂: Proportion of the amount of a fraction polymerized at the second stage

W₃: Proportion of the amount of a fraction polymerized at the third stage $W_1 + W_2 + W_3 = 1.0$ (Note) *1—Sampled and observed at the respective stages.

MFR₂ and MFR₃ were calculated according to the following equations:

$$\log MFR_{1+2} = \left(\frac{W_1}{W_1 + W_2}\right) \log MFR_1 + \left(\frac{W_2}{W_1 + W_2}\right) \log MFR_2$$

$$\log MFR_{1+2+3} = \left(\frac{W_1 + W_2}{W_1 + W_2 + W_3}\right) \log MFR_{1+2} + \left(\frac{W_3}{W_1 + W_2 + W_3}\right) \log MFR_3$$

◎ Content of ethylene—

According to method of infrared absorption spectra.

◎ Reaction ratio of ethylene/propylene at the respective stages—

Copolymers having the reaction ratio of ethylene/propylene varied were in advance prepared, and employing the copolymers as standard samples, calibration curves were prepared by way of infrared absorption spectra (140° C., A720/A730). The reaction ratios at the second and third stages were sought according to difference spectrum method.

◎ Calculation of $W_1$, $W_2$ and $W_3$—

Calculated from the ethylene contents in the copolymers at the respective stages and the reaction ratios of ethylene/propylene at the respective stages.

◎ Method for measuring the physical properties of injection-molded products—

* Bending modulus: JIS K 6758 (Kg f/cm²)
* Bending strength: JIS K 6758 (Kg f/cm²)
* Tensile strength: JIS K 6758 (Kg f/cm²)
* Tensile elongation (breaking point): Ditto (%)
* Izod impact strength (II): JIS K 6758 (Kg fcm/cm)
* Luster: JIS Z 8741 (%)
* Impact whitening: According to Chisso method; i.e. a piece of an injection-molded product of 50 mm×50 mm×2 mm (thick) was contacted with a point of impact having a semisphere of 6.3 mm in radius at its tip end, using a Demabon impact tester at 23° C.; 500 g of a weight was dropped thereon from a height of 1 m; and the diameter of whitened part (mm) was measured.

◎ Method for measuring the physical properties of sheet-molded products (sheet thickness: 0.8 mm)—

* Young's modulus: ASTM D 882 (Kg f/mm²)
* Punching impact strength: ASTM D 781 (kg f.cm)
* Folding whitening: According to Chisso method (mm); i.e. when a sheet was folded and whitening began to occur, the folded radius at that time was measured.
* Impact whitening: This is similar to the case of the injection molding, but the radius of point of impact was 3.2 mm, and 200 g of a weight was dropped from a height of 50 cm and the radius of whitened part was measured (mm).
* Sheet appearance—Viewing.

EXAMPLE 1

(1) Preparation of catalyst n-Hexane (600 ml), diethylaluminum monochloride (DEAC) (0.50 mol) and diisoamyl ether (1.20 mol) were mixed at 25° C. for one minute, followed by reaction at the same temperature for 5 minutes to obtain a reaction liquid P (molar ratio of diisoamyl ether/DEAC: 2.4). TiCl₄ (4.0 mols) was placed in a nitrogen-purged reactor and heated to 35° C., followed by dropwise adding thereto the total amount of the above-mentioned reaction liquid P over 180 minutes, keeping the mixture at the same temperature as above for 30 minutes, raising the temperature up to 75° C., further reacting for one hour, cooling down to room temperature to remove the supernatant and four times repeating a procedure of adding n-hexane (4,000 ml) and removing the supernatant by decantation, to obtain a solid product (I) (190 g). The total amount of this product (I) was suspended in n-hexane (3,000 ml) and to the resulting suspension were added diisoamyl ether (160 g) and TiCl₄ (350 g) at room temperature (20° C.) over about one minute, followed by reacting the mixture at 65° C. for one hour, thereafter cooling down to room temperature (20° C.), removing the supernatant by decantation, five times repeating a procedure of adding n-hexane (4,000 ml), stirring for 10 minutes and still standing to remove the supernatant, and drying under reduced pressure to obtain a solid product (II).

(2) Preparation of preactivated catalyst

A 20 l capacity stainless reactor equipped with slant blades was purged with nitrogen gas, and to this reactor were added n-hexane (15 l), diethylaluminum monochloride (42 g) and the solid product (II) (30 g) at room temperature, under a propylene partial pressure of 5 Kg/cm²G for 5 minutes and removing unreacted propylene, hydrogen and n-hexane under reduced pressure to obtain a preactivated catalyst in the form of powder (reacted propylene per g of the solid product (II): 82.0 g).

(3) First stage polymerization of propylene

A 400 l capacity stainless polymerization vessel equipped with turbine type agitating blades was purged with nitrogen gas, and into this vessel were fed n-hexane (250 l), and then diethylaluminum monochloride (10 g), the above-mentioned preactivated catalyst (10 g) and methyl p-toluylate (11.0 g), followed by adding hydrogen (50 Nl) and then raising the liquid phase temperature up to 60° C. Thereafter propylene was fed and the total pressure was raised up to 10 Kg/cm²G. After 60° C. and 10 Kg/cm²G were attained, propylene containing 2% by weight of ethylene was fed and polymerized for 4 hours under 60° C. and 10 Kg/cm²G. During the polymerization, the hydrogen concentration in the gas phase was analyzed by gas chromatography, and hydrogen was additionally added so that 3% by mol could be maintained. After the polymerization was continued for 4 hours, propylene feed was stopped, followed by purging unreacted propylene, taking out a portion of the slurry in the polymerization vessel, filtering, washing and drying to obtain polypropylene powder.

This powder had a MFR of 3.4 and an ethylene content of 1.4%.

(4) Second stage polymerization

While the inside of the polymerization vessel after purging of unreacted propylene was kept at 60° C. and 0.1 Kg/cm$^2$G, ethylene and polypropylene as raw materials for the second stage polymerization were continuously fed at a definite rate for 1.5 hour so as to give an ethylene feed proportion of 90% by weight. The total amount of ethylene fed was 4.6 Kg. During the polymerization, hydrogen was fed so as to give a gas phase hydrogen concentration of 60%. After 1.5 hour polymerization, the feed of ethylene and propylene was stopped and unreacted ethylene and propylene were purged. A portion of the slurry in the polymerization vessel was taken, filtered, washed and dried to obtain powder of a polypropylene copolymer (hereinafter referred to often as polypropylene). This powder had a MFR of 2.7 and an ethylene content of 11.9% by weight. Further, the ethylene content in the copolymer fraction formed at the second stage was calculated to give 95%.

(5) Third stage polymerization

While the inside of the polymerization vessel after purging of unreacted propylene was kept at 60° C. and 0.1 Kg/cm$^2$G, ethylene and propylene as raw materials for the third stage polymerization were continuously fed at a definite rate for 3 hours so as to give an ethylene feed proportion of 50% by weight. The total amount of ethylene fed was 4.2 Kg. During the polymerization, hydrogen was fed so as to give a gas phase hydrogen concentration of 15% by mol. After 3 hour polymerization, the feed of ethylene and propylene was stopped and unreacted ethylene and propylene were purged.

Methanol (25 l) was then fed into the polymerization vessel and the temperature was raised up to 75° C. After 30 minutes, 20% NaOH aqueous solution (100 g) was added, followed by stirring for 20 minutes, adding purified water (100 l), purging remaining propylene, withdrawing the aqueous layer, further adding purified water (100 l), water-washing with stirring for 10 minutes, withdrawing the aqueous layer, then withdrawing polypropylene-n-hexane slurry, filtering and drying to obtain polypropylene powder, which was then analyzed as in the case of the second stage. The results are shown in Table 1.

(6) Production of injection-molded product

A phenolic heat stabilizer (0.016 Kg) and calcium stearate (0.016 Kg) were added to the polypropylene powder (18.0 Kg) obtained in the above item (5), and these were mixed by a high rate agitation type mixer (Henschel mixer, tradename) at room temperature for 10 minutes, followed by granulating the mixture by an extrusion-granulator having a screw bore diameter of 40 mm. The resulting granulated material was molded by an injection molding machine at a molten resin temperature of 230° C. and a mold temperature of 50° C., into a test piece of JIS form, which was then conditioned for 72 hours in a room of humidity 50% and 23° C., followed by measuring values of physical properties as shown in Table A listed later.

(7) Production of sheet-molded material

The granulated material obtained in the above item (6) was molded by an extrusion-molding machine having a screw bore diameter of 50 mm at 225° C., into a sheet having a width of 60 cm and a thickness of 0.8 mm, which was then conditioned for 72 hours in a room of humidity 50% and 23° C., followed by measuring values of physical properties as shown in Table A.

Comparative examples 1 and 2

Example 1 was repeated except that in place of the preactivated catalyst in Example 1, a commercially available catalyst (AA type) obtained by reducing TiCl$_4$ with metal aluminum followed by activation by milling (30 g or 45 g) and methyl p-toluylate (0 g or 22 g) were used, and at the first stage, hydrogen fed was 25Nl or 50Nl and the hydrogen concentration in the gas phase gas was 1.5 or 3.0% by mol, and at the second and third stages, the hydrogen concentrations in the gas phase gas were as shown in Table 1. The preparation conditions are shown in Table 1 and the results are shown in Table A. As apparent from these Tables, even if a titanium trichloride (AA) is used in place of the catalyst component of the present invention, no high-rigidity copolymer can be obtained. Further, even if a titanium trichloride (AA) is used together with MPT, a notable improvement in rigidity as in the present invention is not observed.

COMPARATIVE EXAMPLE 3

Anhydrous magnesium chloride (20 g), ethyl benzoate (10.0 ml) and methylpolysiloxane (6.0 ml) were milled in a ball mill for 100 hours. The resulting solid product (15 g) was suspended in TiCl$_4$ (200 ml), followed by stirring the suspension at 80° C. for 2 hours, removing the liquid by filtration, washing with n-hexane till no TiCl$_4$ was detected in the filtrate, and drying to obtain a solid catalyst. Thereafter Example 1 was repeated except that the above solid product (7 g) was used in place of the preactivated catalyst of Example 1, TEA (10 g) was used in place of DEAC, and the amount of hydrogen was varied as shown in Table 1. The preparation conditions and the results are shown in the Table and Table A. As seen from these Tables, according to such a supported type catalyst, no high-rigidity polypropylene as aimed in the present invention can be obtained.

COMPARATIVE EXAMPLE 4

In the reaction in Example 1 wherein the solid product (I) was obtained, DEAC (0.5 mol) was used in place of the reaction liquid P and dropwise addition was carried out as in Example 1 but at 0° C. in place of 35° C., followed by raising the temperature up to 75° C., reacting with stirring for one hour, refluxing at the boiling temperature of TiCl$_4$ (about 136° C.) for 4 hours, to convert the material into a violet one, cooling, thereafter washing with n-hexane, filtering and drying as in Example 1 to obtain a solid catalyst. Example 1 was then repeated except that the solid catalyst was used in place of the preactivated catalyst of Example 1 and hydrogen at the respective stages was changed as shown in Table 1. The results are shown in Table A. The resulting product in this case was also inferior to the copolymer of Example 1 in overall rigidity.

EXAMPLES 2, 3 AND 4 AND COMPARATIVE EXAMPLES 5, 6 AND 7

Example 1 was repeated except that the amount of MPT used, and hence the mol ratio of the aromatic ester/the solid product was varied. Further, the amount of the preactivated catalyst was 6 g in Example 2 and Comparative examples 5 and 6, 20 g in Comparative example 7 and 12 g in Example 3.

Further, the amounts of ethylene and propylene fed at the second and third stages in Example 4 and Comparative example 7 were changed to ½ and ⅛ of those in Example 1, respectively. The hydrogen feed was carried out under the conditions shown in Table 2. The results are shown in Table A.

TABLE 1

|  |  |  | Example 1 | Comparative example 1 | Comparative example 2 | Comparative example 3 | Comparative example 4 |
|---|---|---|---|---|---|---|---|
| Catalyst | Aromatic ester/solid product | mol ratio | MPT 1.0 | 0 | MPT | — | MPT 1.0 |
|  | Organoaluminum |  | DEAC | → | → | — | DEAC |
|  | Kind of catalyst component |  | Present invention | AA type | → | supported type | Reduced type |
|  | $H_2$ fed at 1st stage | Nl | 50 | 25 | 50 | 20 | 46 |
| 1st stage polymerization | $H_2$ (in gas phase gas) | mol % | 3.0 | 1.5 | 3.0 | 1.2 | 2.8 |
|  | Ethylene/total monomer fed | Wt. % | 2.0 | → | → | → | → |
|  | Polymerization time | Hr. | 4.0 | → | → | → | → |
|  | MFR | g/10 min. | 3.4 | 2.8 | 2.9 | 3.5 | 3.2 |
| 2nd stage polymerization | $H_2$ (in gas phase gas) | mol % | 60 | 50 | 60 | 45 | 55 |
|  | Ethylene/total monomer fed | Wt. % | 90 | → | → | → | → |
|  | Polymerization time | Hr. | 1.5 | → | → | → | → |
|  | MFR | g/10 min. | 2.7 | 2.2 | 2.3 | 2.7 | 2.5 |
| 3rd stage polymerization | $H_2$ (in gas phase gas) | mol % | 15 | 12 | 15 | 10 | 12 |
|  | Ethylene/total monomer fed | Wt. % | 50 | → | → | → | → |
|  | Polymerization time | Hr. | 3.0 | → | → | → | → |
|  | MFR | g/10 min. | 2.0 | 1.6 | 1.8 | 2.1 | 1.9 |
|  | Polymer yield | Kg | 44 | 41 | 40 | 43 | 40 |
| Polymer analysis | MFR at 1st stage | g/10 min. | 3.4 | 2.8 | 2.9 | 3.5 | 3.2 |
|  | MFR at 2nd stage | " | 0.3 | 0.2 | 0.3 | 0.3 | 0.4 |
|  | MFR at 3rd stage | " | 0.2 | 0.1 | 0.2 | 0.2 | 0.1 |
|  | $C_2H_4$ at 1st stage | Wt. % | 1.4 | 1.6 | 1.5 | 1.6 | 1.7 |
|  | $C_2H_4$ at 2nd stage | " | 95 | 96 | 93 | 95 | 94 |
|  | $C_2H_4$ at 3rd stage | " | 72 | 70 | 73 | 71 | 74 |
|  | Polymerization proportion, 1st/2nd/3rd |  | 79/10/11 | 81/9/10 | 79/11/10 | 80/10/10 | 80/11/9 |

TABLE 2

|  |  |  | Example 2 | Example 3 | Example 4 | Comparative example 5 | Comparative example 6 |
|---|---|---|---|---|---|---|---|
| Catalyst | Aromatic ester/solid product | mol ratio | 0.2 | 2.0 | 7.0 | MPT 0 | 0.05 |
|  | Organoaluminum |  | DEAC | → | → | → | → |
|  | Kind of catalyst component |  | Present invention | → | → | → | → |
|  | $H_2$ fed at 1st stage | Nl | 42 | 66 | 110 | 28 | 33 |
| 1st stage polymerization | $H_2$ (in gas phase gas) | mol % | 2.5 | 4.0 | 6.5 | 1.7 | 2.0 |
|  | Ethylene/total monomer fed | Wt. % | 2.0 | → | → | → | → |
|  | Polymerization time | Hr. | 4.0 | → | → | → | → |
|  | MFR | g/10 min. | 3.6 | 3.0 | 2.7 | 3.4 | 3.3 |
| 2nd stage polymerization | $H_2$ (in gas phase gas) | mol % | 55 | 65 | 70 | 50 | 55 |
|  | Ethylene/total monomer fed | Wt. % | 90 | → | → | → | → |
|  | Polymerization time | Hr. | 1.5 | → | → | → | → |
|  | MFR | g/10 min. | 2.8 | 2.4 | 2.1 | 2.7 | 2.5 |
| 3rd stage polymerization | $H_2$ (in gas phase gas) | mol % | 13 | 15 | 17 | 10 | 10 |
|  | Ethylene/total monomer fed | Wt. % | 50 | → | → | → | → |
|  | Polymerization time | Hr. | 3.0 | → | → | → | → |
|  | MFR | g/10 min. | 2.0 | 1.7 | 1.7 | 2.0 | 1.9 |
|  | Polymer yield | Kg | 42 | 41 | 21 | 43 | 42 |
| Polymer analysis | MFR at 1st stage | g/10 min. | 3.6 | 3.0 | 2.7 | 3.4 | 3.3 |
|  | MFR at 2nd stage | " | 0.3 | 0.2 | 0.3 | 0.3 | 0.2 |
|  | MFR at 3rd stage | " | 0.2 | 0.1 | 0.2 | 0.2 | 0.1 |
|  | $C_2H_4$ at 1st stage | Wt. % | 1.6 | 1.8 | 1.5 | 1.7 | 1.4 |
|  | $C_2H_4$ at 2nd stage | " | 96 | 94 | 95 | 94 | 96 |
|  | $C_2H_4$ at 3rd stage | " | 70 | 72 | 75 | 70 | 71 |
|  | Polymerization proportion, 1st/2nd/3rd |  | 78/10/12 | 81/8/11 | 79/12/9 | 80/9/11 | 81/10/9 |

TABLE A

|  |  |  | Example 1 | Comparative example 1 | Comparative example 2 | Comparative example 3 | Comparative example 4 | Example 2 | Example 3 | Example 4 | Compar. ex. 5 | Compar. ex. 6 |
|---|---|---|---|---|---|---|---|---|---|---|---|---|
|  | Pellet MFR | g/10 min. | 1.8 | 1.5 | 1.6 | 1.9 | 1.8 | 1.8 | 1.6 | 1.5 | 1.8 | 1.7 |
| Physical properties of injection-molded product | Tensile strength | Kg/cm$^2$ | 325 | 275 | 287 | 256 | 294 | 306 | 335 | 342 | 260 | 291 |
|  | Tensile elongation | % | >300 | >300 | >300 | >300 | >300 | >300 | >300 | >300 | >300 | >300 |
|  | Bending modulus | 10$^4$ Kg/cm$^2$ | 1.35 | 0.95 | 1.09 | 0.88 | 1.12 | 1.23 | 1.38 | 1.42 | 0.90 | 1.05 |
|  | Bending strength | Kg/cm$^2$ | 365 | 305 | 318 | 262 | 320 | 342 | 376 | 381 | 266 | 307 |
|  | Izod impact | 23° C. Kg cm/cm | 11.6 | 12.0 | 10.8 | 11.2 | 10.9 | 12.5 | 11.1 | 10.5 | 11.4 | 11.8 |
|  | Luster | % | 82 | 81 | 81 | 84 | 78 | 85 | 80 | 81 | 83 | 81 |

TABLE A-continued

|  |  |  | Example | Comparative example |  |  |  | Example |  |  | Compar. ex. |  |
|---|---|---|---|---|---|---|---|---|---|---|---|---|
|  |  |  | 1 | 1 | 2 | 3 | 4 | 2 | 3 | 4 | 5 | 6 |
| Physical properties of sheet | Impact whitening | mm | <1 | <1 | <1 | <1 | <1 | <1 | <1 | <1 | <1 | <1 |
|  | Young's modulus* | Kg/cm² | 96 | 75 | 84 | 70 | 86 | 89 | 97 | 100 | 71 | 80 |
|  | Punching impact strength |  |  |  |  |  |  |  |  |  |  |  |
|  | 23° C. | Kg · cm | >30 | >30 | >30 | >30 | >30 | >30 | >30 | >30 | >30 | >30 |
|  | −10° C. | " | >30 | >30 | >30 | >30 | >30 | >30 | >30 | >30 | >30 | >30 |
|  | −30° C. | " | >30 | >30 | >30 | >30 | >30 | >30 | >30 | >30 | >30 | >30 |
|  | Folding whitening | mm | 6 | 5 | 8 | 6 | 8 | 5 | 7 | 9 | 5 | 6 |
|  | Impact whitening | mm | 1.4 | 1.6 | 1.8 | 1.3 | 1.6 | 1.2 | 1.7 | 1.9 | 1.3 | 1.5 |
|  | Sheet appearance | — | Good | → | → | → | → | → | → | → | → | → |

*Average in longitudinal and lateral directions

As apparent from these Tables, if the mol ratio of the aromatic ester/the solid product used in the polymerization is less than 0.05, improvement in the rigidity of the resulting block copolymers is insufficient. Further, in the case of Comparative example 7 wherein the above mol ratio far exceeded 10.0, while the resulting polymer had a high rigidity, the catalyst activity lowered to a large extent.

EXAMPLES 5, 6 AND 7

Example 1 was repeated except that the following organoaluminum compounds a∼c were used in place of DEAC:

a: Di-n-propylaluminum monochloride (Example 7)
b: Di-i-butylaluminum monochloride (Example 8)
c: Diethylaluminum monoiodide (Example 9)

The polymerization conditions and the results are shown in Table 3 and Table B. As apparent from these Tables, both the yields and the physical properties in these Examples are nearly similar to those in Example 1.

EXAMPLES 8∼13

Example 1 was repeated except that the following aromatic esters d∼i were used in a definite amount in place of MPT:

d: Ethyl p-toluylate—12.0 g (Example 8)
e: Butyl p-toluylate—14.0 g (Example 9)
f: Methyl benzoate—10.0 g (Example 10)
g: Ethyl benzoate—11.0 g (Example 11)
h: Methyl p-anisate—12.0 g (Example 12)
i: Ethyl p-anisate—13.0 g (Example 13)

The polymerization conditions and the results are shown in Tables 3, 4 and B. As apparent from these Tables, the yields and physical properties in these Examples are nearly similar to those of Example 1.

EXAMPLES 14 AND 15 AND COMPARATIVE EXAMPLES 8 AND 9

Example 1 was repeated except that the amount of ethylene fed and the amount of hydrogen at the first stage were varied as shown in Table 5. Further, in Comparative example 8, the amounts of monomers fed at the second and third stages were changed to 75% of those in Example 1. The results are shown in Table C.

TABLE 3

|  |  |  | Compar. ex. | Example |  |  |  |
|---|---|---|---|---|---|---|---|
|  |  |  | 7 | 5 | 6 | 7 | 8 |
| Catalyst | Aromatic ester/solid product | mol ratio | MPT 13 | 1.0 | → | → | d 1.0 |
|  | Organoaluminum |  | DEAC | a | b | c | DEAC |
|  | Kind of catalyst component |  | Present invention | → | → | → | → |
| 1st stage polymerization | H₂ fed at 1st stage | Nl | 125 | 50 | → | → | → |
|  | H₂ (in gas phase gas) | mol % | 7.5 | 3.0 | → | → | → |
|  | Ethylene/total monomer fed | Wt. % | 2.0 | → | → | → | → |
|  | Polymerization time | Hr. | 4.0 | → | → | → | → |
|  | MFR | g/10 min. | 3.5 | 3.5 | 3.1 | 3.4 | 3.2 |
| 2nd stage polymerization | H₂ (in gas phase gas) | mol % | 70 | 60 | → | → | → |
|  | Ethylene/total monomer fed | Wt. % | 90 | → | → | → | → |
|  | Polymerization time | Hr. | 1.5 | → | → | → | → |
|  | MFR | g/10 min. | 2.9 | 2.7 | 2.5 | 2.5 | 2.6 |
| 3rd stage polymerization | H₂ (in gas phase gas) | mol % | 18 | 15 | → | → | → |
|  | Ethylene/total monomer fed | Wt. % | 50 | → | → | → | → |
|  | Polymerization time | Hr. | 3.0 | → | → | → | → |
|  | MFR | g/10 min. | 2.3 | 2.2 | 1.8 | 1.9 | 1.9 |
|  | Polymer yield | Kg | 8.7 | 43 | 41 | 39 | 42 |
| Polymer analysis | MFR at 1st stage | g/10 min. | 3.5 | 3.5 | 3.1 | 3.4 | 3.2 |
|  | MFR at 2nd stage | " | 0.4 | 0.3 | 0.2 | 0.2 | 0.3 |
|  | MFR at 3rd stage | " | 0.2 | 0.3 | 0.2 | 0.2 | 0.2 |
|  | C₂H₄ at 1st stage | Wt. % | 1.5 | 1.6 | 1.6 | 1.4 | 1.7 |
|  | C₂H₄ at 2nd stage | " | 95 | 96 | 96 | 94 | 96 |
|  | C₂H₄ at 3rd stage | " | 76 | 72 | 72 | 73 | 71 |
|  | Polymerization proportion, 1st/2nd/3rd |  | 83/9/8 | 81/10/9 | 80/8/12 | 79/11/10 | 79/10/11 |

TABLE 4

|  |  |  | Example 9 | Example 10 | Example 11 | Example 12 | Example 13 |
|---|---|---|---|---|---|---|---|
| Catalyst | Aromatic ester/solid product | mol ratio | e 1.0 | f 1.0 | g 1.0 | h 1.0 | i 1.0 |
|  | Organoaluminum |  | DEAC | → | → | → | → |
|  | Kind of catalyst component |  | Present invention | → | → | → | → |
| 1st stage polymerization | $H_2$ fed at 1st stage | Nl | 50 | → | → | → | → |
|  | $H_2$ (in gas phase gas) | mol % | 3.0 | → | → | → | → |
|  | Ethylene/total monomer fed | Wt. % | 2.0 | → | → | → | → |
|  | Polymerization time | Hr. | 4.0 | → | → | → | → |
|  | MFR | g/10 min. | 3.4 | 2.8 | 2.9 | 3.4 | 3.2 |
| 2nd stage polymerization | $H_2$ (in gas phase gas) | mol % | 60 | → | → | → | → |
|  | Ethylene/total monomer fed | Wt. % | 90 | → | → | → | → |
|  | Polymerization time | Hr. | 1.5 | → | → | → | → |
|  | MFR | g/10 min. | 2.8 | 2.3 | 2.4 | 2.7 | 2.4 |
| 3rd stage polymerization | $H_2$ (in gas phase gas) | mol % | 15 | → | → | → | → |
|  | Ethylene/total monomer fed | Wt. % | 50 | → | → | → | → |
|  | Polymerization time | Hr. | 3.0 | → | → | → | → |
|  | MFR | g/10 min. | 2.3 | 1.7 | 1.8 | 2.1 | 1.8 |
|  | Polymer yield | Kg | 40 | 38 | 39 | 42 | 41 |
| Polymer analysis | MFR at 1st stage | g/10 min. | 3.4 | 2.8 | 2.9 | 3.4 | 3.2 |
|  | MFR at 2nd stage | " | 0.4 | 0.3 | 0.4 | 0.4 | 0.3 |
|  | MFR at 3rd stage | " | 0.3 | 0.1 | 0.2 | 0.2 | 0.2 |
|  | $C_2H_4$ at 1st stage | Wt. % | 1.8 | 1.6 | 1.9 | 1.5 | 1.7 |
|  | $C_2H_4$ at 2nd stage | " | 95 | 95 | 96 | 94 | 96 |
|  | $C_2H_4$ at 3rd stage | " | 70 | 73 | 72 | 74 | 71 |
|  | Polymerization proportion, 1st/2nd/3rd |  | 82/9/9 | 81/10/9 | 80/9/11 | 81/10/9 | 78/11/11 |

TABLE B

|  |  |  | Example 5 | Example 6 | Example 7 | Example 8 | Example 9 | Example 10 | Example 11 | Example 12 | Example 13 |
|---|---|---|---|---|---|---|---|---|---|---|---|
| Physical properties of injection-molded product | Pellet MFR | g/10 min. | 2.0 | 1.7 | 1.7 | 1.8 | 2.1 | 1.5 | 1.6 | 1.9 | 1.7 |
|  | Tensile strength | Kg/cm² | 320 | 324 | 327 | 323 | 330 | 318 | 310 | 322 | 314 |
|  | Tensile elongation | % | >300 | >300 | >300 | >300 | >300 | >300 | >300 | >300 | >300 |
|  | Bending modulus | 10⁴ Kg/cm² | 1.32 | 1.34 | 1.37 | 1.41 | 1.38 | 1.33 | 1.30 | 1.34 | 1.28 |
|  | Bending strength | Kg/cm² | 360 | 362 | 365 | 375 | 368 | 362 | 356 | 367 | 351 |
|  | Izod impact 23° C. | Kg cm/cm | 10.9 | 12.5 | 11.5 | 11.8 | 11.2 | 11.0 | 11.7 | 10.6 | 11.7 |
|  | Luster | % | 78 | 80 | 82 | 82 | 81 | 83 | 84 | 82 | 83 |
|  | Impact whitening | mm | <1 | <1 | <1 | <1 | <1 | <1 | <1 | <1 | <1 |
| Physical properties of sheet | Young's modulus* | Kg/cm² |  |  |  |  |  |  |  |  |  |
|  | Punching impact strength |  |  |  |  |  |  |  |  |  |  |
|  | 23° C. | Kg · cm |  |  |  |  |  |  |  |  |  |
|  | −10° C. | " |  |  |  |  |  |  |  |  |  |
|  | −30° C. | " |  |  |  |  |  |  |  |  |  |
|  | Folding whitening | mm |  |  |  |  |  |  |  |  |  |
|  | Impact whitening | mm |  |  |  |  |  |  |  |  |  |
|  | Sheet appearance | — |  |  |  |  |  |  |  |  |  |

*Average in longitudinal and lateral directions

As apparent from these Tables, in the case of Comparative example 8 wherein no ethylene is fed at the first stage, the effectiveness of whitening improvement is inferior, and in the case of Comparative example 9, since the ethylene proportion at the first stage is too high, reduction in the rigidity is great.

COMPARATIVE EXAMPLE 10

Example 1 was repeated except that polymerization at the second stage was omitted. The polymerization conditions are shown in Table 5 and the results are shown in Table C. In the case where polymerization at the second stage was omitted, the effectiveness of whitening improvement is notably inferior.

COMPARATIVE EXAMPLE 11

Example 1 was repeated except that polymerization at the third stage was omitted. The polymerization conditions are shown in Table 6. In the case where the third stage polymerization was omitted, the effectiveness of impact strength improvement is notably inferior.

TABLE 5

|  |  |  | Example 14 | Example 15 | Comparative example 8 | Comparative example 9 | Comparative example 10 |
|---|---|---|---|---|---|---|---|
| Catalyst | Aromatic ester/solid product | mol ratio | MPT 1.0 | → | → | → | → |
|  | Organoaluminum |  | DEAC | → | → | → | → |
|  | Kind of catalyst component |  | Present invention | → | → | → | → |
| 1st stage polymerization | $H_2$ fed at 1st stage | Nl | 58 | 60 | 40 | 66 | 50 |
|  | $H_2$ (in gas phase gas) | mol % | 3.5 | 3.7 | 2.6 | 4.0 | 3.0 |
|  | Ethylene/total monomer fed | Wt. % | 4.5 | 6.5 | 0 | 8.5 | 2.0 |

TABLE 5-continued

|  |  |  | Example | | Comparative example | | |
|---|---|---|---|---|---|---|---|
|  |  |  | 14 | 15 | 8 | 9 | 10 |
|  | Polymerization time | Hr. | 4.0 | → | → | → | → |
|  | MFR | g/10 min. | 3.5 | 3.1 | 3.2 | 3.1 | 3.2 |
| 2nd stage polymerization | $H_2$ (in gas phase gas) | mol % | 60 | → | → | → | — |
|  | Ethylene/total monomer fed | Wt. % | 90 | → | → | → | — |
|  | Polymerization time | Hr. | 1.5 | → | → | → | — |
|  | MFR | g/10 min. | 2.8 | 2.3 | 2.6 | 2.4 | — |
| 3rd stage polymerization | $H_2$ (in gas phase gas) | mol % | 15 | → | → | → | → |
|  | Ethylene/total monomer fed | Wt. % | 50 | → | → | → | → |
|  | Polymerization time | Hr. | 3.0 | → | → | → | → |
|  | MFR | g/10 min. | 2.2 | 1.8 | 2.1 | 1.8 | 2.3 |
|  | Polymer yield | Kg | 39 | 41 | 32 | 38 | 36 |
| Polymer analysis | MFR at 1st stage | g/10 min. | 3.5 | 3.1 | 3.2 | 3.1 | 3.2 |
|  | MFR at 2nd stage | " | 0.3 | 0.2 | 0.4 | 0.3 | — |
|  | MFR at 3rd stage | " | 0.2 | 0.1 | 0.3 | 0.1 | 0.2 |
|  | $C_2H_4$ at 1st stage | Wt. % | 3.1 | 4.5 | 0 | 6.2 | 1.6 |
|  | $C_2H_4$ at 2nd stage | " | 95 | 93 | 96 | 96 | — |
|  | $C_2H_4$ at 3rd stage | " | 74 | 73 | 70 | 74 | 73 |
|  | Polymerization proportion, 1st/2nd/3rd |  | 82/9/9 | 81/10/9 | 80/10/10 | 80/11/9 | 90/—/10 |

TABLE 6

|  |  |  | Compar. ex. | Example | | Comparative example | |
|---|---|---|---|---|---|---|---|
|  |  |  | 11 | 16 | 17 | 12 | 13 |
| Catalyst | Aromatic ester/solid product | mol ratio | MPT 1.0 | → | → | → | → |
|  | Organoaluminum |  | DEAC | → | → | → | → |
|  | Kind of catalyst component |  | Present | → | → | → | → |
|  | $H_2$ fed at 1st stage | Nl | 50 | → | → | → | → |
| 1st stage polymerization | $H_2$ (in gas phase gas) | mol % | 3.0 | → | → | → | → |
|  | Ethylene/total monomer fed | Wt. % | 2.0 | → | → | → | → |
|  | Polymerization time | Hr. | 4.0 | → | → | → | → |
|  | MFR | g/10 min. | 3.0 | 3.3 | 3.2 | 3.4 | 3.3 |
| 2nd stage polymerization | $H_2$ (in gas phase gas) | mol % | 60 | 70 | 60 | 40 | 10 |
|  | Ethylene/total monomer fed | Wt. % | 90 | 100 | 80 | 65 | 25 |
|  | Polymerization time | Hr. | 1.5 | → | → | → | 2.0 |
|  | MFR | g/10 min. | 2.3 | 2.4 | 2.7 | 2.6 | 2.6 |
| 3rd stage polymerization | $H_2$ (in gas phase gas) | mol % | — | 15 | → | → | → |
|  | Ethylene/total monomer fed | Wt. % | — | 50 | → | → | → |
|  | Polymerization time | Hr. | — | 3.0 | → | → | → |
|  | MFR | g/10 min. | — | 1.8 | 2.2 | 2.1 | 2.0 |
|  | Polymer yield | Kg | 37 | 42 | 38 | 40 | 41 |
| Polymer analysis | MFR at 1st stage | g/10 min. | 3.0 | 3.3 | 3.2 | 3.4 | 3.3 |
|  | MFR at 2nd stage | " | 0.3 | 0.2 | 0.5 | 0.4 | 0.3 |
|  | MFR at 3rd stage | " | — | 0.2 | 0.3 | 0.3 | 0.2 |
|  | $C_2H_4$ at 1st stage | Wt. % | 1.7 | 1.6 | 1.7 | 1.5 | 1.6 |
|  | $C_2H_4$ at 2nd stage | " | 96 | 100 | 91 | 81 | 52 |
|  | $C_2H_4$ at 3rd stage | " | — | 72 | 73 | 72 | 74 |
|  | Polymerization proportion, 1st/2nd/3rd |  | 89/11/— | 79/10/11 | 81/9/10 | 80/11/9 | 81/10/9 |

TABLE C

|  |  |  | Example | | Comparative example | | | | Example | | Compar. ex. | |
|---|---|---|---|---|---|---|---|---|---|---|---|---|
|  |  |  | 14 | 15 | 8 | 9 | 10 | 11 | 16 | 17 | 12 | 13 |
|  | Pellet MFR | g/10 min. | 2.0 | 1.7 | 1.9 | 1.8 | 2.0 | 2.1 | 1.7 | 1.8 | 1.9 | 1.8 |
| Physical properties of injection-molded product | Tensile strength | Kg/cm² | 296 | 250 | 362 | 224 | 337 | 345 | 348 | 320 | 312 | 308 |
|  | Tensile elongation | % | >300 | >300 | >300 | >300 | >300 | >300 | >300 | >300 | >300 | >300 |
|  | Bending modulus | $10^4$ Kg/cm² | 1.12 | 0.90 | 1.51 | 0.73 | 1.38 | 1.41 | 1.43 | 1.35 | 1.31 | 1.27 |
|  | Bending strength | Kg/cm² | 323 | 258 | 405 | 225 | 370 | 383 | 390 | 361 | 354 | 347 |
|  | Izod impact 23° C. | Kg cm/cm | 12.5 | 13.1 | 11.2 | 15.1 | 10.5 | 4.0 | 10.5 | 11.6 | 14.1 | 16.5 |
|  | Luster | % | 87 | 90 | 72 | 91 | 81 | 82 | 78 | 81 | 83 | 83 |
|  | Impact whitening | mm | <1 | <1 | 13.8 | <1 | 15.6 | 10.5 | <1 | <1 | 10.8 | 17.4 |
| Physical properties of sheet | Young's modulus* | Kg/cm² | 88 | 68 | 112 | 55 | 98 | 101 |  |  |  |  |
|  | Punching impact strength |  |  |  |  |  |  |  |  |  |  |  |
|  | 23° C. | Kg · cm | >30 | >30 | >30 | >30 | >30 | 14 |  |  |  |  |
|  | −10° C. | " | >30 | >30 | >30 | >30 | >30 | 6 |  |  |  |  |
|  | −30° C. | " | >30 | >30 | 16 | >30 | 11 | 3 |  |  |  |  |
|  | Folding whitening | mm | 2 | 2 | 14 | 2 | 9 | 2 |  |  |  |  |
|  | Impact whitening | mm | 0 | 0 | 7.4 | 0 | 6.5 | 0 |  |  |  |  |
|  | Sheet appearance | — | Good | → | → | → | → | → |  |  |  |  |

*Average in longitudinal and lateral directions

EXAMPLES 16 AND 17 AND COMPARATIVE EXAMPLES 12, 13 AND 14

Example 1 was repeated except that the polymerization conditions at the second stage were varied as shown in Table 6. The amounts of ethylene fed were 4.5 Kg, 4.2 Kg, 3.8 Kg, 2.6 Kg and 1.2 Kg and the proportion of ethylene/(ethylene+propylene) fed and the hydrogen concentration were as shown in Table 6. The results are shown in Tables C and D. When the ethylene content in the copolymer fraction at the second stage is low as in Comparative examples 12, 13 and 14, the effectiveness of impact whitening improvement is small and the rigidity improvement is also small.

EXAMPLES 18 AND 19 AND COMPARATIVE EXAMPLES 15, 16 AND 17

Example 1 was repeated except that the polymerization conditions at the third stage were changed as shown in Tables 7 and 8. The amounts of ethylene fed were 3.4 Kg, 3.6 Kg, 2.3 Kg, 3.8 Kg and 4.7 Kg. The proportion of ethylene/(ethylene+propylene) fed and the hydrogen concentration were as shown in Tables 7 and 8. The results are shown in Table D. When the ethylene content in the polymer at the third stage is low as in Comparative examples 15 and 16, the effectiveness of whitening improvement is inferior, and when it is too high as in Comparative example 17, the impact strength is low.

EXAMPLES 20 AND 21 AND COMPARATIVE EXAMPLES 18 AND 19

Example 1 was repeated except that the amount of polymer formed at the second stage was varied. The amounts of ethylene fed at the second stage were 2.6 Kg, 7.0 Kg, 1.2 Kg and 9.6 Kg, respectively. The polymerization time and the hydrogen concentration were varied as shown in Table 8. When the polymerization amount at the second stage is too small, whitening improvement is insufficient. When it is too large, opacity of sheet increases and at the same time, reduction in luster and reduction in rigidity occur; hence while the effectiveness of whitening improvement is good, other physical properties are undesirable.

EXAMPLES 22 AND 23 AND COMPARATIVE EXAMPLES 20 AND 21

Example 1 was repeated except that the amount of polymer formed at the third stage was varied. The amounts of ethylene fed at the third stage were 2.3 Kg, 8.8 Kg, 1.1 Kg and 13.7 Kg, respectively, and polymerization time was varied as shown in Tables 8 and 9. The results are shown in Tables D and E. When the polymerization amount at the third stage is small, impact strength is small. If it is too large, the effectiveness of whitening improvement is low.

EXAMPLES 24 AND 25 AND COMPARATIVE EXAMPLES 22 AND 23

Example 1 was repeated except that the ratio of first stage MFR/second stage MFR was varied. The amounts of ethylene fed at the second stage were 4.8 Kg, 6.7 Kg, 3.1 Kg and 5.3 Kg, respectively, and the hydrogen amounts and the hydrogen concentrations in the gas phase at the first and second stages were varied as shown in Tables 9 and 10. The results are shown in Table E. As apparent from these Tables, when the ratio of first stage MFR/second stage MFR is higher than those of the present invention, the tensile elongation is reduced and the impact strength is also reduced as in Comparative example 22. Further it becomes necessary to notably raise the gas phase hydrogen concentration to thereby reduce the monomer concentration as much; hence even if it is raised over those of the present invention, there is no merit. On the other hand, when the ratio of first stage MFR/second stage MFR is lower than those of the present invention, the appearance of sheet is inferior as in Comparative example 23.

TABLE 7

|  |  |  | Compar. ex. | Example | | Comparative example | |
|---|---|---|---|---|---|---|---|
|  |  |  | 14 | 18 | 19 | 15 | 16 |
| Catalyst | Aromatic ester/solid product | mol ratio | MPT 1.0 | → | → | → | → |
|  | Organoaluminum |  | DEAC | → | → | → | → |
|  | Kind of catalyst component |  | Present invention | → | → | → | → |
|  | $H_2$ fed at 1st stage | Nl | 50 | → | → | → | → |
| 1st stage polymerization | $H_2$ (in gas phase gas) | mol % | 3.0 | → | → | → | → |
|  | Ethylene/total monomer fed | Wt. % | 2.0 | → | → | → | → |
|  | Polymerization time | Hr. | 4.0 | → | → | → | → |
|  | MFR | g/10 min. | 2.9 | 3.4 | 3.2 | 3.0 | 3.2 |
| 2nd stage polymerization | $H_2$ (in gas phase gas) | mol % | 8.0 | 60 | → | → | → |
|  | Ethylene/total monomer fed | Wt. % | 10 | 90 | → | → | → |
|  | Polymerization time | Hr. | 2.5 | 1.5 | → | → | → |
|  | MFR | g/10 min. | 2.4 | 2.6 | 2.8 | 2.4 | 2.7 |
| 3rd stage polymerization | $H_2$ (in gas phase gas) | mol % | 15 | 12 | 18 | 6 | 8 |
|  | Ethylene/total monomer fed | Wt. % | 50 | 43 | 60 | 12 | 30 |
|  | Polymerization time | Hr. | 3.0 | → | → | → | → |
|  | MFR | g/10 min. | 1.9 | 2.0 | 3.3 | 1.6 | 1.8 |
|  | Polymer yield | Kg | 43 | 41 | 44 | 39 | 40 |
| Polymer analysis | MFR at 1st stage | g/10 min. | 2.9 | 3.4 | 3.2 | 3.0 | 3.2 |
|  | MFR at 2nd stage | " | 0.3 | 0.3 | 0.4 | 0.3 | 0.4 |
|  | MFR at 3rd stage | " | 0.3 | 0.2 | 0.4 | 0.1 | 0.08 |
|  | $C_2H_4$ at 1st stage | Wt. % | 1.6 | 1.5 | 1.5 | 1.7 | 1.6 |
|  | $C_2H_4$ at 2nd stage | " | 24 | 96 | 95 | 95 | 96 |
|  | $C_2H_4$ at 3rd stage | " | 71 | 67 | 78 | 32 | 56 |
|  | Polymerization proportion, 1st/2nd/3rd |  | 82/8/10 | 79/11/10 | 82/9/9 | 77/10/13 | 80/8/12 |

TABLE 8

| | | | Comparative example | | | | |
|---|---|---|---|---|---|---|---|
| | | | 17 | 18 | 19 | 20 | 21 |
| Catalyst | Aromatic ester/solid product | mol ratio | MPT 1.0 | → | → | → | → |
| | Organoaluminum | | DEAC | → | → | → | → |
| | Kind of catalyst component | | Present invention | → | → | → | → |
| 1st stage polymerization | H$_2$ fed at 1st stage | Nl | 50 | → | → | → | → |
| | H$_2$ (in gas phase gas) | mol % | 3.0 | → | → | → | → |
| | Ethylene/total monomer fed | Wt. % | 2.0 | → | → | → | → |
| | Polymerization time | Hr. | 4.0 | → | → | → | → |
| | MFR | g/10 min. | 3.1 | 3.2 | 3.1 | 3.4 | 3.3 |
| 2nd stage polymerization | H$_2$ (in gas phase gas) | mol % | 60 | 55 | 60 | → | → |
| | Ethylene/total monomer fed | Wt. % | 90 | → | → | → | → |
| | Polymerization time | Hr. | 1.5 | 0.5 | 3.0 | 1.5 | → |
| | MFR | g/10 min. | 2.4 | 3.0 | 1.8 | 2.6 | 2.6 |
| 3rd stage polymerization | H$_2$ (in gas phase gas) | mol % | 25 | 15 | → | → | → |
| | Ethylene/total monomer fed | Wt. % | 75 | 50 | → | → | → |
| | Polymerization time | Hr. | 3.0 | → | → | 0.75 | 6.0 |
| | MFR | g/10 min. | 1.7 | 2.3 | 1.3 | 2.4 | 0.9 |
| | Polymer yield | Kg | 43 | 38 | 46 | 37 | 48 |
| Polymer analysis | MFR at 1st stage | g/10 min. | 3.1 | 3.2 | 3.1 | 3.4 | 3.3 |
| | MFR at 2nd stage | " | 0.3 | 0.5 | 0.2 | 0.3 | 0.3 |
| | MFR at 3rd stage | " | 0.1 | 0.2 | 0.1 | 0.5 | 0.08 |
| | C$_2$H$_4$ at 1st stage | Wt. % | 1.5 | 1.7 | 1.5 | 1.6 | 1.7 |
| | C$_2$H$_4$ at 2nd stage | " | 95 | 97 | 94 | 95 | 96 |
| | C$_2$H$_4$ at 3rd stage | " | 87 | 72 | 70 | 75 | 69 |
| | Polymerization proportion, 1st/2nd/3rd | | 79/11/10 | 87/3/10 | 71/20/9 | 77/10/3 | 60/9/31 |

TABLE 9

| | | | Example | | | | |
|---|---|---|---|---|---|---|---|
| | | | 20 | 21 | 22 | 23 | 24 |
| Catalyst | Aromatic ester/solid product | mol ratio | MPT 1.0 | → | → | → | → |
| | Organoaluminum | | DEAC | → | → | → | → |
| | Kind of catalyst component | | present invention | → | → | → | → |
| 1st stage polymerization | H$_2$ fed at 1st stage | Nl | 50 | → | → | → | 36 |
| | H$_2$ (in gas phase gas) | mol % | 3.0 | → | → | → | 2.2 |
| | Ethylene/total monomer fed | Wt. % | 2.0 | → | → | → | → |
| | Polymerization time | Hr. | 4.0 | → | → | → | → |
| | MFR | g/10 min. | 3.2 | 3.5 | 3.4 | 3.5 | 2.1 |
| 2nd stage polymerization | H$_2$ (in gas phase gas) | mol % | 60 | → | → | → | 85 |
| | Ethylene/total monomer fed | Wt. % | 90 | → | → | → | → |
| | Polymerization time | Hr. | 1.0 | 2.0 | 1.5 | → | → |
| | MFR | g/10 min. | 2.8 | 2.3 | 2.6 | 2.7 | 2.4 |
| 3rd stage polymerization | H$_2$ (in gas phase gas) | mol % | 15 | → | → | → | → |
| | Ethylene/total monomer fed | Wt. % | 50 | → | → | → | → |
| | Polymerization time | Hr. | 3.0 | → | 2.0 | 5.0 | 3.0 |
| | MFR | g/10 min. | 2.1 | 1.8 | 2.3 | 1.3 | 1.9 |
| | Polymer yield | Kg | 40 | 45 | 39 | 45 | 42 |
| Polymer analysis | MFR at 1st stage | g/10 min. | 3.2 | 3.5 | 3.4 | 3.5 | 2.1 |
| | MFR at 2nd stage | " | 0.4 | 0.2 | 0.3 | 0.2 | 9.7 |
| | MFR at 3rd stage | " | 0.2 | 0.2 | 0.3 | 0.1 | 0.2 |
| | C$_2$H$_4$ at 1st stage | Wt. % | 1.6 | 1.5 | 1.6 | 1.7 | 1.6 |
| | C$_2$H$_4$ at 2nd stage | " | 96 | 93 | 95 | 95 | 97 |
| | C$_2$H$_4$ at 3rd stage | " | 72 | 71 | 74 | 70 | 72 |
| | Polymerization proportion, 1st/2nd/3rd | | 83/6/10 | 75/15/10 | 83/11/6 | 70/9/21 | 81/10/9 |
| | (MFR) 1st stage/(MFR) 2nd stage | | | | | | 0.2 |

TABLE 10

| | | | Example | Comparative example | | | |
|---|---|---|---|---|---|---|---|
| | | | 25 | 22 | 23 | 24 | 25 |
| Catalyst | Aromatic ester/solid product | mol ratio | MPT 1.0 | → | → | → | → |
| | Organoaluminum | | DEAC | → | → | → | → |
| | Kind of catalyst component | | Present invention | → | → | → | → |
| 1st stage polymerization | H$_2$ fed at 1st stage | Nl | 74 | 20 | 74 | 50 | → |
| | H$_2$ (in gas phase gas) | mol % | 4.5 | 1.2 | 4.5 | 3.0 | → |
| | Ethylene/total monomer fed | Wt. % | 2.0 | → | → | → | → |
| | Polymerization time | Hr. | 4.0 | → | → | → | → |
| | MFR | g/10 min. | 6.5 | 0.8 | 6.7 | 3.2 | 3.4 |
| 2nd stage polymerization | H$_2$ (in gas phase gas) | mol % | 45 | 90 | 25 | 60 | → |
| | Ethylene/total monomer fed | Wt. % | 90 | 90 | 90 | → | → |
| | Polymerization time | Hr. | 2.0 | 2.0 | 2.0 | → | → |
| | MFR | g/10 min. | 3.3 | 1.0 | 3.7 | 2.5 | 2.5 |

TABLE 10-continued

|  |  |  | Example | Comparative example | | | |
|---|---|---|---|---|---|---|---|
|  |  |  | 25 | 22 | 23 | 24 | 25 |
| 3rd stage polymerization | H$_2$ (in gas phase gas) | mol % | 15 | 15 | 15 | 5 | 25 |
|  | Ethylene/total monomer fed | Wt. % | 50 | 50 | 50 | → | → |
|  | Polymerization time | Hr. | 3.0 | 3.0 | 3.0 | → | → |
|  | MFR | g/10 min. | 2.5 | 0.8 | 2.7 | 1.3 | 2.2 |
|  | Polymer yield | Kg | 44 | 40 | 43 | 39 | 40 |
| Polymer analysis | MFR at 1st stage | g/10 min. | 6.5 | 0.8 | 6.7 | 3.2 | 3.4 |
|  | MFR at 2nd stage | " | 0.08 | 15 | 0.05 | 0.3 | 0.2 |
|  | MFR at 3rd stage | " | 0.2 | 0.3 | 0.2 | 0.01 | 0.8 |
|  | C$_2$H$_4$ at 1st stage | Wt. % | 1.5 | 1.7 | 1.7 | 1.6 | 1.7 |
|  | C$_2$H$_4$ at 2nd stage | " | 92 | 98 | 92 | 96 | 95 |
|  | C$_2$H$_4$ at 3rd stage | " | 73 | 72 | 70 | 69 | 74 |
|  | Polymerization proportion, 1st/2nd/3rd | ° | 74/15/11 | 81/7/12 | 78/12/10 | 78/10/12 | 80/11/9 |
|  | (MFR) 1st stage/(MFR) 2nd stage |  | 81 | 0.05 | 130 |  |  |

TABLE D

|  |  | Compar. ex. | Example | | Comparative example | | | | | | |
|---|---|---|---|---|---|---|---|---|---|---|---|
|  |  | 14 | 18 | 19 | 15 | 16 | 17 | 18 | 19 | 20 | 21 |
| Physical properties of injection-molded product | Pellet MFR (g/10 min.) | 1.7 | 1.7 | 3.0 | 1.5 | 1.7 | 1.5 | 2.1 | 1.2 | 2.1 | 0.9 |
|  | Tensile strength (Kg/cm$^2$) | 305 | 307 | 331 | 301 | 304 | 348 | 335 | 302 | 351 | 281 |
|  | Tensile elongation (%) | >400 | >400 | >400 | >400 | >400 | >400 | >400 | >400 | >400 | >400 |
|  | Bending modulus (10$^4$ Kg/cm$^2$) | 1.25 | 1.32 | 1.39 | 1.23 | 1.26 | 1.42 | 1.40 | 1.31 | 1.42 | 1.06 |
|  | Bending strength (Kg/cm$^2$) | 341 | 357 | 384 | 331 | 338 | 391 | 390 | 355 | 395 | 307 |
|  | Izod impact 23° C. (Kg cm/cm) | 12.5 | 13.9 | 10.3 | 13.1 | 14.5 | 6.2 | 10.3 | 12.8 | 5.1 | >50 |
|  | Luster (%) | 85 | 81 | 79 | 85 | 84 | 75 | 82 | 74 | 81 | 72 |
|  | Impact whitening (mm) | 15.6 | 3.4 | <1 | 12.7 | 17.8 | <1 | 14.1 | <1 | <1 | 13 |
| Physical properties of sheet | Young's modulus* (Kg/cm$^2$) |  |  |  |  |  |  |  | 98 | 93 | 103 | 78 |
|  | Punching impact strength |  |  |  |  |  |  |  |  |  |  |  |
|  | 23° C. (Kg · cm) |  |  |  |  |  |  |  | >30 | >30 | 11 | >30 |
|  | −10° C. " |  |  |  |  |  |  |  | >30 | >30 | 6 | >30 |
|  | −30° C. " |  |  |  |  |  |  |  | 8 | >30 | 3 | >30 |
|  | Folding whitening (mm) |  |  |  |  |  |  |  | 13 | 2 | 2 | 11 |
|  | Impact whitening (mm) |  |  |  |  |  |  |  | 8.1 | 0 | 0 | 7.5 |
|  | Sheet appearance — |  |  |  |  |  |  |  | Good | White, opaque | Good | Good |

*Average in longitudinal and lateral directions

TABLE E

|  |  | Example | | | | | | Comparative example | | | |
|---|---|---|---|---|---|---|---|---|---|---|---|
|  |  | 20 | 21 | 22 | 23 | 24 | 25 | 22 | 23 | 24 | 25 |
| Physical properties of injection-molded product | Pellet MFR (g/10 min.) | 1.9 | 1.7 | 2.1 | 1.3 | 1.8 | 2.2 | 0.8 | 2.5 | 1.2 | 2.0 |
|  | Tensile strength (Kg/cm$^2$) | 328 | 317 | 327 | 303 | 335 | 306 | 320 | 309 | 311 | 315 |
|  | Tensile elongation (%) | >400 | >400 | >400 | >400 | >400 | >400 | 250 | >400 | >400 | 280 |
|  | Bending modulus (10$^4$ Kg/cm$^2$) | 1.39 | 1.35 | 1.38 | 1.25 | 1.38 | 1.33 | 1.36 | 1.33 | 1.36 | 1.37 |
|  | Bending strength (Kg/cm$^2$) | 383 | 363 | 375 | 349 | 390 | 355 | 367 | 370 | 275 | 280 |
|  | Izod impact 23° C. (Kg cm/cm) | 11.5 | 11.9 | 8.5 | 26 | 10.4 | 12.6 | 9.8 | 12.3 | 12.5 | 8.1 |
|  | Luster (%) | 83 | 79 | 84 | 79 | 85 | 72 | 84 | 64 | 65 | 82 |
|  | Impact whitening (mm) | 5.6 | <1 | <1 | 6.4 | <1 | <1 | <1 | <1 | 4.3 | <1 |
| Physical properties of sheet | Young's modulus* (Kg/cm$^2$) | 97 | 96 | 101 | 91 | 98 | 96 | 97 | 98 | 95 | 99 |
|  | Punching impact strength |  |  |  |  |  |  |  |  |  |  |
|  | 23° C. (Kg · cm) | >30 | >30 | >30 | >30 | >30 | >30 | >30 | >30 | >30 | >30 |
|  | −10° C. " | >30 | >30 | 23 | >30 | >30 | >30 | 26 | >30 | >30 | 17 |
|  | −30° C. " | >30 | >30 | 16 | >30 | 17 | >30 | 18 | >30 | >30 | 11 |
|  | Folding whitening (mm) | 4 | 2 | 2 | 5 | 2 | 2 | 2 | 2 | 4 | 2 |
|  | Impact whitening (mm) | 2.6 | 0 | 0 | 1.8 | 0 | 0 | 0 | 0 | 1.5 | 0 |
|  | Sheet appearance — | Good | Good | Good | Good | Good | Good | Good | Surface roughened | Surface roughened | Good |

*Average in longitudinal and lateral directions

COMPARATIVE EXAMPLES 24 AND 25

Example 1 was repeated except that the gas phase hydrogen concentration at the second stage was varied as shown in Table 10. The results are shown in Table E. When the MFR at the third stage was lower than those of the present invention, the appearance of sheet was inferior. When it was higher than those of the present invention, the impact strength lowered.

EXAMPLES 26, 27 AND 28

Example 1 was repeated except that the amount of hydrogen at the first stage was varied and the MFR of product was varied. The preparation conditions are shown in Table 11 and the results are shown in Table F.

EXAMPLE 29 AND COMPARATIVE EXAMPLE 26

In these examples, polypropylene obtained in Example 1 was used in Example 29 and that obtained in Comparative example 4 was used in Comparative example 26, and aluminum p-tert-butylbenzoate (0.048 Kg) as a nucleus-creating agent at the time of granulation was added. The results are shown in Table F. When the copolymer of the present invention was used, a notable improvement in the rigidity due to the nucleus-creating agent was exhibited.

COMPARATIVE EXAMPLE 27

A high density polyethylene (MI=2.5) (160 g) was added at the time of granulation of polypropylene obtained in Comparative example 10. The results are shown in Table F. Even if polyethylene is added at the time of granulation in place of the second stage polymerization, the effectiveness of whitening improvement is not so much observed as that of the present invention.

TABLE 11

| | | | Comparative example | |
|---|---|---|---|---|
| | | | 26 | 27 |
| Catalyst | Aromatic ester/solid product | mol ratio | MPT 1.0 | → |
| | Organoaluminum | | DEAC | → |
| | Kind of catalyst component | | Present invention | → |
| 1st stage polymerization | $H_2$ fed at 1st stage | Nl | 10 | 116 |
| | $H_2$ (in gas phase gas) | mol % | 0.6 | 7.0 |
| | Ethylene/total monomer fed | Wt. % | 2.0 | → |
| | Polymerization time | Hr. | 4.0 | → |
| | MFR | g/10 min. | 0.2 | 13.4 |
| 2nd stage polymerization | $H_2$ (in gas phase gas) | mol % | 60 | → |
| | Ethylene/total monomer fed | Wt. % | 90 | → |
| | Polymerization time | Hr. | 1.5 | → |
| | MFR | g/10 min. | 0.2 | 9.4 |
| 3rd stage polymerization | $H_2$ (in gas phase gas) | mol % | 15 | → |
| | Ethylene/total monomer fed | Wt. % | 50 | → |
| | Polymerization time | Hr. | 3.0 | → |
| | MFR | g/10 min. | 0.2 | 6.4 |
| | Polymer yield | Kg | | |
| Polymer analysis | MFR at 1st stage | g/10 min. | 0.2 | 13.4 |
| | MFR at 2nd stage | " | 0.2 | 0.4 |

TABLE 11-continued

| | | Comparative example | |
|---|---|---|---|
| | | 26 | 27 |
| MFR at 3rd stage | " | 0.2 | 0.3 |
| $C_2H_4$ at 1st stage | Wt. % | 1.7 | 1.6 |
| $C_2H_4$ at 2nd stage | " | 95 | 94 |
| $C_2H_4$ at 3rd stage | " | 70 | 72 |
| Polymerization proportion, 1st/2nd/3rd | | 80/11/9 | 79/10/11 |

TABLE F

| | | | Example | | | | Compar. ex. | |
|---|---|---|---|---|---|---|---|---|
| | | | 26 | 27 | 28 | 29 | 26 | 27 |
| Physical properties of injection-molded product | Pellet MFR | g/10 min. | 0.2 | 6.0 | 8.7 | 1.8 | 1.8 | 2.5 |
| | Tensile strength | Kg/cm$^2$ | 301 | 348 | 361 | 386 | 356 | 308 |
| | Tensile elongation | % | >400 | >400 | 283 | 176 | 168 | 267 |
| | Bending modulus | 10$^4$ Kg/cm$^2$ | 1.30 | 1.42 | 1.45 | 1.75 | 1.41 | 1.33 |
| | Bending strength | Kg/cm$^2$ | 358 | 398 | 402 | 468 | 401 | 374 |
| | Izod impact 23° C. | Kg cm/cm | 36 | 8.6 | 5.8 | 10.6 | 10.8 | 11.2 |
| | Luster | % | 84 | 79 | 78 | 80 | 81 | 76 |
| | Impact whitening | mm | <1 | 2.6 | 4.5 | 2.5 | 2.8 | 12.5 |
| Physical properties of sheet | Young's modulus* | Kg/cm$^2$ | | | | 121 | 108 | 94 |
| | Punching impact strength | | | | | | | |
| | 23° C. | Kg · cm | | | | >30 | >30 | >30 |
| | −10° C. | " | | | | >30 | >30 | >30 |
| | −30° C. | " | | | | 18 | 21 | 16 |
| | Folding whitening | mm | | | | 7 | 7 | 6 |
| | Impact whitening | mm | | | | 2.1 | 1.9 | 5.7 |
| | Sheet appearance | — | | | | Good | → | → |

*Average in longitudinal and lateral directions

What we claim is:

1. A process for producing a high-rigidity, resistant to whitening upon stressing ethylene-propylene copolymer, which process comprises a sequence of three stages that includes:

(1) in a first stage producing between 60 and 90% by weight of the final product by copolymerizing a monomer mixture of ethylene and propylene wherein ethylene constitutes 0.7–7.5% by weight of the mixture, (2) in a subsequent second stage producing between 5 and 17% by weight of the final product by polymerizing a monomer mixture of ethylene and propylene wherein ethylene constitutes 70–100% by weight of the mixture, and (3) in a subsequent third stage producing between 6 and 23% by weight of the final product by copolymerizing a monomer mixture of ethylene and propylene wherein the ethylene constitutes 40–70% by weight of the mixture, said three stages being carried out in the presence of hydrogen and a catalyst obtained by (a) reacting an organoaluminum compound (L) or a reaction product (P) of an organoaluminum compound (L) with an electron donor (A) with TiCl$_4$ (C), (b) reacting the resulting solid product (I) with an electron donor (A) and an electron acceptor (B), and (c) combining the resulting solid product (II) with an organoaluminum compound (L$_2$) and an aromatic carboxylic acid ester (R), (d) the molar ratio of the carboxylic acid ester (R) to the solid product (II) being between 0.2 and 10, and the partial pressure of said hydrogen being adjusted so that the ratio of the MFR of the copolymer fraction obtained in the first stage to the MFR of the product obtained in the second stage will be in the range of 0.1 to 100, and the MFR of the copolymer fraction obtained at the third stage will be in the range of 0.05 to 0.5.

2. A process according to claim 1 wherein a dialkylaluminum monohalide of 1 to 12 carbon atoms is used as said organoaluminum compound ($L_2$).

3. A process according to claim 1 wherein an alpha-olefin is reacted with the combined catalyst of said solid product (II) and said organoaluminum compound ($L_2$) in an amount of 0.05 to 200 times the weight of said solid product (II) and the resulting preactivated catalyst is used.

4. A process according to claim 1 wherein the first stage produces 70–86% by weight of the final product, the second stage produces 7–14% by weight of the final product and the third stage produces 8–15% by weight of the final product.

5. A process according to claim 1 wherein the ethylene content of the monomer mixture is 1.5–4% by weight in the first stage, 80–95% by weight in the second stage and 45–55% by weight in the third stage.

6. A process according to claim 4 wherein the ethylene content of the monomer mixture is 1.5–4% by weight in the first stage, 80–95% by weight in the second stage, and 45–55% by weight in the third stage.

7. A process according to claim 1 wherein the ethylene content of the product of the first stage is 0.5 to 5.0%, the ethylene content of the product of the second stage is 85–100% and the ethylene content of the product of the third stage is 65–80%.

8. A process according to claim 4 wherein the ethylene content of the product of the first stage is 0.5 to 5.0%, the ethylene content of the product of the second stage is 85–100% and the ethylene content of the product of the third stage is 65–80%.

9. A process according to claim 6 wherein the ethylene content of the product of the first stage is 0.5 to 5.0%, the ethylene content of the product of the second stage is 85–100%, and the ethylene content of the product of the third stage is 65–80%.

10. A process according to claim 1 wherein the ethylene content of the product of the first stage is 1 to 3%, the ethylene content of the product of the second stage is 90–98% and the ethylene content of the product of the third stage is 70–75%.

11. A process according to claim 4 wherein the ethylene content of the product of the first stage is 1 to 3%, the ethylene content of the product of the second stage is 90–98% and the ethylene content of the product of the third stage is 70–75%.

12. A process according to claim 6 wherein the ethylene content of the product of the first stage is 1 to 3%, the ethylene content of the product of the second stage is 90–98%, and the ethylene content of the product of the third stage is 70–75%.

13. A high-rigidity, resistant to whitening upon stressing ethylene-propylene copolymer produced according to the process of claim 1 wherein the ethylene content of the product of the first stage is 0.5 to 5.0%, the ethylene content of the product of the second stage is 85–100%, and the ethylene content of the product of the third stage is 65–80%.

14. A high rigidity, resistant to whitening upon stressing ethylene-propylene copolymer produced according to the process of claim 1 wherein the ethylene content of the product of the first stage is 1 to 3%, the ethylene content of the product of the second stage is 90–98% and the ethylene content of the product of the third stage is 70–75%.

* * * * *